E. E. GREAVES.
CONNECTION FOR ELECTRIC CONDUITS.
APPLICATION FILED JULY 25, 1912.

1,190,641.

Patented July 11, 1916.

WITNESSES:
Chas H. Young

INVENTOR.
Edwin E. Greaves
BY
Parsons Hall Bodell
ATTORNEYS.

UNITED STATES PATENT OFFICE.

EDWIN E. GREAVES, OF SYRACUSE, NEW YORK, ASSIGNOR TO CROUSE-HINDS COMPANY, OF SYRACUSE, NEW YORK, A CORPORATION OF NEW YORK.

CONNECTION FOR ELECTRIC CONDUITS.

1,190,641.  Specification of Letters Patent.  Patented July 11, 1916.

Application filed July 25, 1912. Serial No. 711,430.

*To all whom it may concern:*

Be it known that I, EDWIN E. GREAVES, of Syracuse, in the county of Onondaga and State of New York, have invented a certain new and useful Connection for Electric Conduits, of which the following is a specification.

This invention has for its object the production of a connection for conduits especially electrical conduits in which it is particularly desirable to have tight joints; and the invention consists in the combinations and constructions hereinafter set forth and claimed.

In describing this invention reference is had to the accompanying drawing in which like characters designate corresponding parts in all the views.

Figure 1:
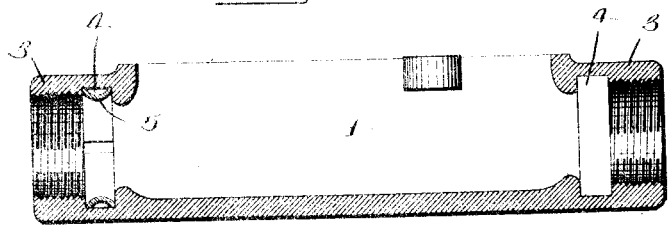
Figure 2:
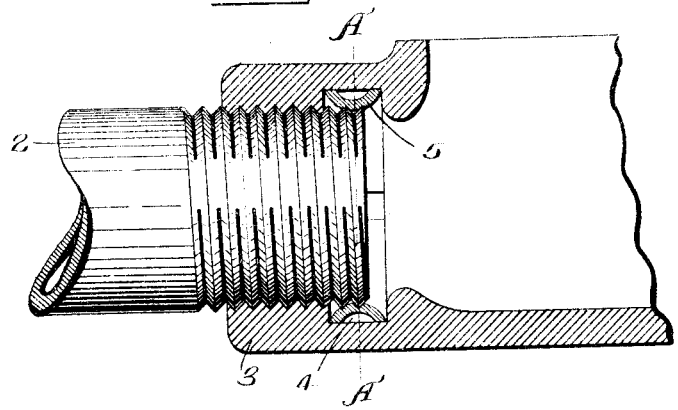
Figure 3:
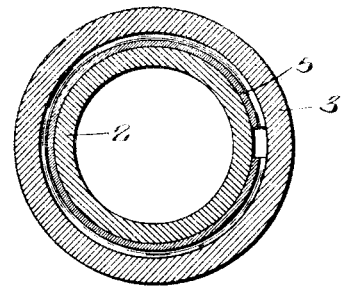

Figure 1 is a longitudinal sectional view of a conduit outlet box used in electrical construction, the box being provided with my invention. Fig. 2 is an enlarged fragmentary view of one end of such box with one end of the electrical conduit turned therein. Fig. 3 is a sectional view on line "A—A," Fig. 2.

1 is a conduit member as an outlet box for electric wires to which box a second member as a pipe or conduit 2 is connected, the box being provided with a threaded connection as an internally threaded nipple 3 for receiving the threaded end of the pipe 2, said nipple 3 having an enlarged recess 4 at the inner end of the threaded passage, the recess being preferably rectangular in cross section.

5 is a ring forming part of the joint between the members 1, 2, said ring being located in the recess 4 and being formed of yielding, non-resilient or soft metal and being constructed to expand and spread as the pipe 2 is turned thereinto, and tightly grip the walls of the recess and the periphery of the pipe.

As here shown the ring 5 is formed with a circumferential groove and with an internal inclined face opposed to the end of the pipe 2 so that during the movement of the pipe into the ring 5, the pipe will engage the inclined face and cause the ring 5 to spread and tightly engage the walls of the recess. In the illustrated embodiment of my invention, the ring is shown concavo-convex in cross section and the inner diameter thereof is less than the diameter of the threaded passage of the nipple 3 and the inner curved face of the ring on one side thereof constitutes the inclined face arranged in the path of the advance end of the pipe 2. The ring is preferably split in order that it may be readily inserted in the recess 4 and also in order that it will be expanded outwardly as the pipe is turned thereinto. As the pipe 2 turns into the ring 5, it also causes the ring to spread laterally and tightly engage the walls of the recess; and owing to the fact that the metal is yielding, the threads of the pipe cut into the inner face of the metal ring, and owing to the spreading and expanding of the ring, the pipe turns into the ring without tearing the same.

What I claim is:

1. The combination of two conduit members, one being formed with a threaded passage, and an enlarged recess at the inner end of the passage, and the other being a pipe threading in the passage, and an expansible and contractile ring in the recess, the ring being formed of yielding nonresilient metal, and having an inclined inner face opposed to the end of the pipe turning in the passage, the inner diameter of the ring being less than the diameter of the passage whereby the end face of said pipe engages the inner face of the ring and causes the ring to expand and grip the walls of the recess and the periphery of the pipe, substantially as and for the purpose described.

2. The combination of two conduit members, one being formed with a threaded passage, and an enlarged recess at the inner end of said passage, and the other member being a pipe turning in such passage, and a metal ring located in the recess and formed with a peripheral circumferential groove, and the inner diameter of the ring being less than that of the passage whereby the end of the pipe turning in the passage engages the inner face of such ring and causes the same to expand and grip the walls of the recess and the periphery of the pipe, substantially as and for the purpose specified.

3. The combination of two conduit members, one being formed with a threaded passage, and an enlarged recess at the inner end of said passage, and the other being a pipe threading in such passage, and a retaining ring in the recess, the ring being concavo-convex in cross section and the diameter of the inner face thereof being less than the diameter of the passage whereby the end face of the pipe turning in said passage engages the inner curved face of the ring and causes the ring to expand and grip the walls of the recess and the periphery of the pipe, substantially as and for the purpose set forth.

4. The combination of two conduit members, one being formed with a threaded passage, and an enlarged recess at the inner end of the passage, and the other being a pipe threading in the passage, and an expansible and contractile transversely split ring in the recess, the ring being formed of yielding, non-resilient metal, and having an inclined inner face opposed to the end of the pipe turning in the passage, the inner diameter of the ring being less than the diameter of the passage whereby the end face of the pipe engages the inner face of the ring and causes the ring to expand and grip the walls of the recess and the periphery of the pipe, substantially as and for the purpose described.

In testimony whereof, I have hereunto signed my name in the presence of two attesting witnesses, at Syracuse, in the county of Onondaga, and State of New York, this 24th day of June, 1912.

EDWIN E. GREAVES.

Witnesses:
C. B. SCHOENECK,
WM. CORNELL BLANDING.